UNITED STATES PATENT OFFICE.

WILLIAM N. BLAKEMAN, JR., OF MOUNT VERNON, NEW YORK.

PROCESS OF HASTENING THE DRYING ACTION OF DRYING-OILS.

SPECIFICATION forming part of Letters Patent No. 496,989, dated May 9, 1893.

Application filed December 2, 1892. Serial No. 453,836. (No specimens.)

*To all whom it may concern:*

Be it known that I, WILLIAM N. BLAKEMAN, Jr., of Mount Vernon, in the county of Westchester and State of New York, have invented a new and useful Process of Hastening the Drying Action of Drying-Oils and Preserving the Color of the Same, which invention is fully set forth in the following specification.

The object of this invention is to supersede the present method of boiling oils with metallic oxides for the purpose of improving their drying action, and to reduce raw oils quickly and economically to a basis equivalent to that of boiled oil.

The boiling of so called "drying oils" (this term being used technically to distinguish them from "fatty" oils) with oxygen-carriers, such as the metallic oxides, in order to hasten the drying properties of the oil, is a tedious and clumsy process, comprising boiling, settling, and bleaching, which extends through many weeks; and while the time necessary to accomplish the drying of the raw oil is reduced thereby from about ninety six hours to about eight to ten hours, yet the color of the oil is very greatly deteriorated and its quality likewise much impaired.

In my process, now to be described, which is simple and expeditious, the color of the oil remains unimpaired, and the drying term of the oil is reduced to about three and a half hours.

In carrying out my said process I proceed first to give the oil selected for treatment, an alkaline or basic reaction and then to unite with it a salt capable of absorbing carbonic acid. If the agent selected for imparting to the oil an alkaline or basic reaction, be one having at the same time an affinity for carbonic acid, then the second step in the process, namely the addition of a salt, absorbent of carbonic acid, will be cumulative or augmentative. Having therefore selected the oil, say raw linseed oil, I add to it by grinding therewith about twenty five parts of basic acetate of lead to one hundred parts of the oil, which imparts to the oil an alkaline or basic reaction. I then add to this mixture by grinding, until union is complete, borate of magnesia in about the proportion of twenty per cent. of the basic acetate used. The oil having been thus treated is ready for immediate use for making paints in mixture with any of the well known pigments, being well suited for use in making any of the well known ready mixed paints of commerce. The oil may, however, if preferred, be left for a few hours for precipitation of any excess of matter that it may hold in suspension, when the supernatant oil may be drawn off for any use desired.

Instead of using basic acetate of lead for imparting an alkaline or basic reaction to the oil, such reaction may be imparted by dissolving in it a metallic soap, preferably a metallic soap capable of absorbing carbonic acid, such as alumina soap, but the basic acetate of lead has been found to give better results. Salts, capable of absorbing carbonic acid, other than borate of magnesia may be used for incorporation with the oil, such as sulphate of magnesia, sulphate of alumina, alum, monometaborate of soda, and like reagents, but I prefer borate of magnesia which is efficient—insoluble in water—and also economical in cost.

I am aware that basic acetate of lead has been used in mixture with drying oils but the great objection to or preventive of said acetate's use, except within narrow limits, is that its presence in the oil renders the oil of a dark yellow, or yellowish-red color, which does not dissipate or bleach. By my process I obviate this difficulty and the reaction of bleaching is readily accomplished in a few hours by the salts introduced, by their absorption of carbonic acid. At the same time their presence in the oil renders it capable of absorbing carbonic acid independently of its powers of absorbing oxygen and thereby hastens its drying action.

If it is desired to add any of the oxygen carriers, such as are commonly employed as "driers," they may be added at any time without departing from my invention. And while all of the reactions above described may be accomplished at ordinary temperatures, yet heat may be employed, to quicken or hasten the changes sought, without departing from my invention.

After the union of the salts, having an affinity for carbonic acid, has been effected with the oil made to exhibit an alkaline or basic reaction, as described, carbonic acid may be charged through the mixture, in any suitable manner.

Having thus fully described my invention, I claim—

1. The hereinbefore described process of improving the drying qualities of drying oils, which consists in combining in chemical union with such oils, an absorbent or absorbents of carbonic acid, and then exposing the oil so treated to the presence of carbonic acid, whereby the oil is rapidly dried, substantially as set forth.

2. The hereinbefore described process of treating drying oils, which consists in first adding to the oil to be treated a reagent basic to carbonic acid and then combining with the oil so treated an agent capable of absorbing carbonic acid, whereby the color of the oil is preserved and its siccative qualities improved, substantially as set forth.

3. The hereinbefore described process of treating drying oils, which consists in first adding an agent to impart to the oil to be treated an alkaline reaction, and then combining with the oil so treated an agent capable of absorbing carbonic acid, whereby the color of the oil is preserved and its siccative qualities improved, substantially as set forth.

4. The process of treating drying-oils, consisting in first incorporating with the oil to be treated, basic acetate of lead or an equivalent alkaline or basic element and then incorporating with this mixture a salt capable of absorbing carbonic acid, such as borate of magnesia or equivalent carbonic-acid-absorbent, substantially as set forth.

5. The process of treating drying-oils, consisting in first imparting to the oil to be treated a reaction basic to carbonic acid, then adding to the oil an agent capable of absorbing carbonic acid, and then subjecting the oil to a discharge therethrough of carbonic acid, substantially as and for the purposes set forth.

6. The process of treating drying-oils, consisting in first imparting to the oil to be treated an alkaline reaction, then adding to the oil an agent capable of absorbing carbonic acid, and then subjecting the oil to a discharge therethrough of carbonic acid, substantially as and for the purposes set forth.

WM. N. BLAKEMAN, JR.

Witnesses:
FRANCIS P. REILLY,
JAMES F. COURT.